(12) United States Patent
Wang (10) Patent No.: US 10,174,748 B2
(45) Date of Patent: Jan. 8, 2019

(54) AIR PUMP HAVING CONCEALED PRESSURE GAUGE

(71) Applicant: Beto Engineering & Marketing Co., Ltd., Taichung (TW)

(72) Inventor: Lo Pin Wang, Taichung (TW)

(73) Assignee: Beto Engineering & Marketing Co., Ltd., Beitun, Taichung (TW)

(*) Notice: Subject to any disclaimer, the term of this patent is extended or adjusted under 35 U.S.C. 154(b) by 345 days.

(21) Appl. No.: 15/062,241

(22) Filed: Mar. 7, 2016

(65) Prior Publication Data

US 2017/0254319 A1  Sep. 7, 2017

(51) Int. Cl.
F04B 33/00 (2006.01)
F04B 51/00 (2006.01)
G01L 19/14 (2006.01)
F04B 39/12 (2006.01)

(52) U.S. Cl.
CPC ............ *F04B 33/00* (2013.01); *F04B 33/005* (2013.01); *F04B 39/12* (2013.01); *F04B 51/00* (2013.01); *G01L 19/14* (2013.01)

(58) Field of Classification Search
CPC ........ F04B 33/00; F04B 33/005; F04B 39/12; F04B 51/00; G01L 19/14
USPC .............................................. 417/63; 73/744
See application file for complete search history.

(56) References Cited

U.S. PATENT DOCUMENTS

| | | | |
|---|---|---|---|
| 4,919,600 A * | 4/1990 | Yang | F04B 33/005 417/313 |
| 5,964,577 A | 10/1999 | Chuang | |
| 6,196,807 B1 * | 3/2001 | Wu | F04B 33/005 417/313 |
| 6,485,264 B1 | 11/2002 | Wu | |
| 6,558,129 B2 | 5/2003 | Wang | |
| 6,805,537 B2 | 10/2004 | Wu | |
| 6,978,670 B2 * | 12/2005 | Cousineau | B60C 23/0496 137/224 |
| 8,336,386 B2 * | 12/2012 | Wang | F04B 33/005 73/700 |
| 2010/0054962 A1 * | 3/2010 | Wu | F04B 33/005 417/234 |

* cited by examiner

*Primary Examiner* — Dominick L Plakkoottam
*Assistant Examiner* — Connor J Tremarche
(74) *Attorney, Agent, or Firm* — Charles E. Baxley (57) ABSTRACT

An air pump device includes a housing having a barrel, a grasping device engaged in the housing for grasping an inflation valve to the housing selectively, a pumping mechanism coupled to the barrel of the housing for generating a pressurized air to the compartment of the housing, and a pressure gauge device engaged within the pumping mechanism for indicating a pressure in the chamber of the barrel and for preventing the pressure gauge device from being exposed. The pumping mechanism includes a tubular member having one end portion coupled to the barrel, and the tubular member includes a space for receiving the pressurized air from the tubular member.

13 Claims, 5 Drawing Sheets

AIR PUMP HAVING CONCEALED PRESSURE GAUGE

BACKGROUND OF THE INVENTION

1. Field of the Invention

The present invention relates to an air pump or hand pump device or apparatus, and more particularly to an air pump or hand pump device or apparatus including an improved pressure gauge hidden or concealed within the air pump or hand pump for preventing the pressure gauge from being exposed and for preventing the pressure gauge from interfering the operation of the air pump device.

2. Description of the Prior Art

Typical air pump devices or apparatuses comprise a piston slidably or movably disposed or engaged in a cylinder housing and movable along or relative to the air pump device for generating a pressurized air and for filling or supplying the pressurized air to selectively inflate various kinds of balls, inner tires of the bicycles or the motorcycles or the vehicles, or other inflatable articles, and a pressure gauge attached or mounted or secured to the air pump device for showing or indicating the pressure within the air pump device.

For example, U.S. Pat. No. 5,964,577 to Chuang, U.S. Pat. No. 6,196,807 to Wu, U.S. Pat. No. 6,485,264 to Wu, U.S. Pat. No. 6,558,129 to Wang, U.S. Pat. No. 6,805,537 to Wu, and U.S. Pat. No. 8,336,386 to Wang disclose several of the typical hand operated air pumps each also comprising a cylinder housing including a chamber or compartment formed therein for slidably or movably receiving or engaging with a piston which is slidable and movable along or relative to the air pump device for generating a pressurized air and for filling or supplying the pressurized air to selectively inflate various kinds of balls, inner tires of the bicycles or the motorcycles or the vehicles, or other inflatable articles, and normally, a pressure gauge is further provided and attached or mounted or secured to the outer peripheral portion of the air pump device for showing or indicating the pressure within the air pump device.

However, the pressure gauge of the typical air pump device or apparatus is normally attached or mounted or secured to the outer peripheral portion of the air pump device and extended out of the air pump device, such that the pressure gauge of the typical air pump device or apparatus may interfere with the operation of the air pump device.

The present invention has arisen to mitigate and/or obviate the afore-described disadvantages of the conventional hand air pump devices.

SUMMARY OF THE INVENTION

The primary objective of the present invention is to provide an air pump device including improved pressure gauge hidden or concealed within the air pump or hand pump for preventing the pressure gauge from being exposed and for preventing the pressure gauge from interfering the operation of the air pump device.

In accordance with one aspect of the invention, there is provided an air pump device comprising a housing including a compartment formed therein, and including a barrel having a chamber formed in the barrel, and having an entrance formed in the barrel and communicating with the compartment of the housing and communicating with the chamber of the barrel for guiding a pressurized air to flow from the chamber of the barrel into the compartment of the housing, a grasping device engaged in the compartment of the housing for engaging with an inflation valve and for grasping the inflation valve to the housing selectively, a pumping mechanism coupled to the barrel of the housing for generating and supplying the pressurized air to the chamber of the barrel and the compartment of the housing, and a pressure gauge device received and engaged within the pumping mechanism for indicating a pressure in the chamber of the barrel. The pressure gauge device is engaged within the pumping mechanism and will not be exposed for preventing the pressure gauge device from interfering the operation of the air pump device.

The pumping mechanism includes a tubular member having a first end portion coupled to the barrel of the housing and having a passage formed in a second end portion of the tubular member, and the tubular member includes a space formed therein and communicating with the passage of the tubular member for receiving the pressurized air from the passage of the tubular member, and the space of the tubular member is provided for receiving the pressure gauge device.

The pressure gauge device includes a cylindrical element engaged in the space of the tubular member, and the cylindrical element includes a graduation provided thereon, and an indicator slidably received and engaged in a bore of the cylindrical element and moveable relative to the graduation of the cylindrical element for indicating the pressure in the chamber of the barrel by the relative position between the indicator and the graduation of the cylindrical element.

The tubular member and the cylindrical element are made of transparent or semi-transparent materials for allowing the relative position between the indicator and the graduation of the cylindrical element to be seen through the tubular member and the cylindrical element.

The cylindrical element includes an outer diameter smaller than an inner diameter of the tubular member for forming a gap between the cylindrical element and the tubular member and for allowing the pressurized air to flow through the gap that is formed between the cylindrical element and the tubular member and then into the housing.

The cylindrical element includes a manifold formed in a first end portion of the cylindrical element and communicating with the gap that is formed between the cylindrical element and the tubular member, and also communicating with the entrance of the barrel of the housing for allowing the pressurized air to flow from the gap into the manifold of the cylindrical element.

The pressure gauge device includes a check valve engaged between the barrel and the cylindrical element for controlling the pressurized air to flow through the manifold of the cylindrical element. The housing includes a depression formed in the barrel and communicating with the entrance of the barrel for engaging with the check valve and for allowing the check valve to control the pressurized air to flow through the manifold of the cylindrical element.

The cylindrical element includes a passage formed in a first end portion of the cylindrical element and communicating with the bore the cylindrical element for receiving the pressurized air into the bore the cylindrical element. The cylindrical element includes at least one pathway formed in a second end portion of the cylindrical element and communicating with the gap that is formed between the cylindrical element and the tubular member for allowing the pressurized air to flow through the pathway and into the gap that is formed between the cylindrical element and the tubular member.

The pressure gauge device includes a sliding member slidably engaged in the bore of the cylindrical element, and the indicator is provided on and moved in concert with the sliding member. The pressure gauge device includes a sealing ring engaged onto the sliding member and contacted with the cylindrical element for making an air tight seal between the cylindrical element and the sliding member.

The pressure gauge device includes a lock nut attached to the cylindrical element, and a spring biasing member engaged between the lock nut and the sliding member for biasing and forcing the sliding member and the indicator to move away from the lock nut selectively. The pressure gauge device includes a shank extended from the lock nut and extended into the bore of the cylindrical element and engaged into the spring biasing member for positioning the spring biasing member.

The cylindrical element includes a flange extended from a first end portion of the cylindrical element and engaged between the housing and the first end portion of the tubular member for anchoring the cylindrical element between the housing and the tubular member. The pumping mechanism includes a sleeve slidably engaged onto the tubular member for generating the pressurized air when the sleeve is moved toward the tubular member and for supplying the pressurized air into the tubular member and the housing.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
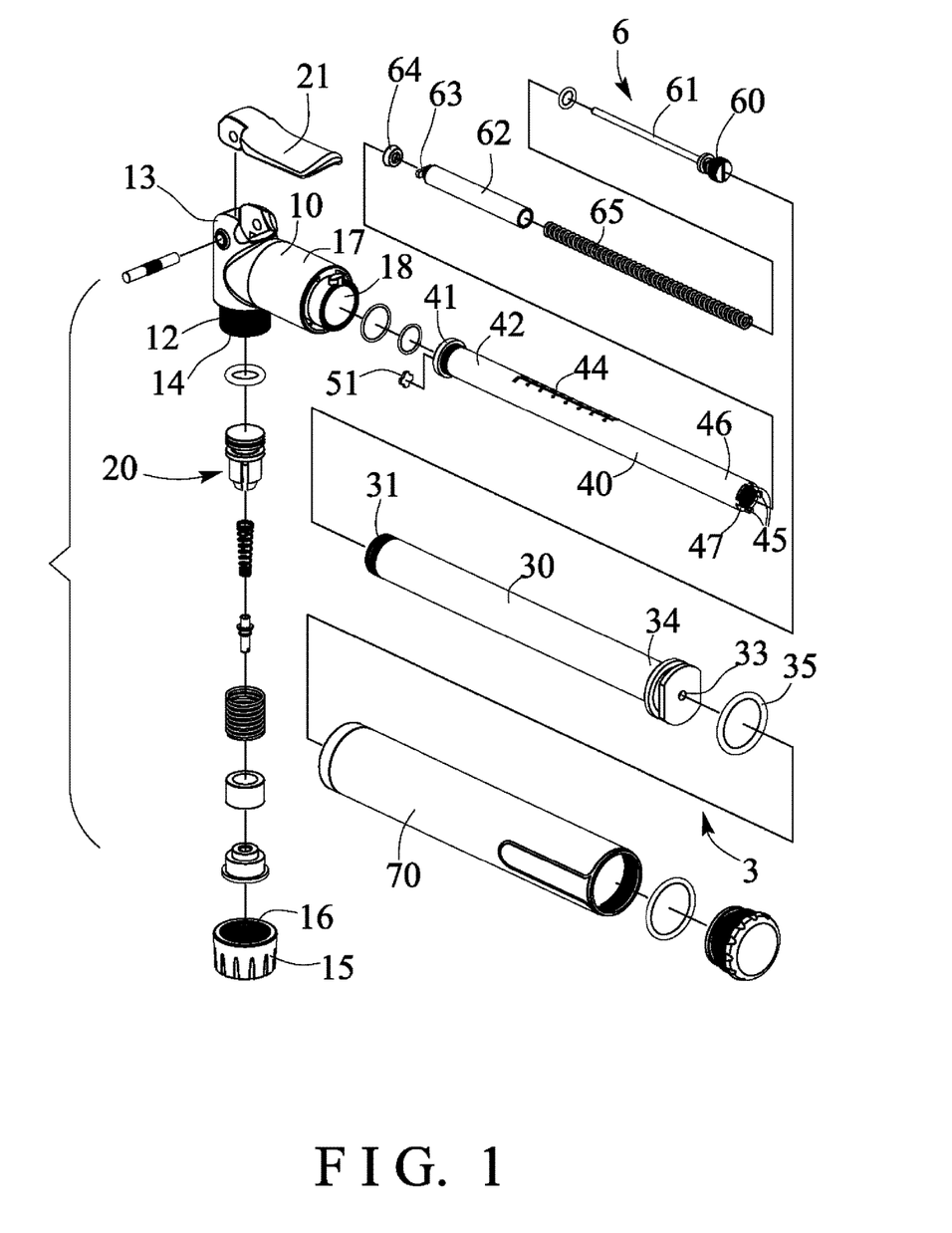
FIG. 1 is a partial exploded view of an air pump device in accordance with the present invention.
Figure 2:
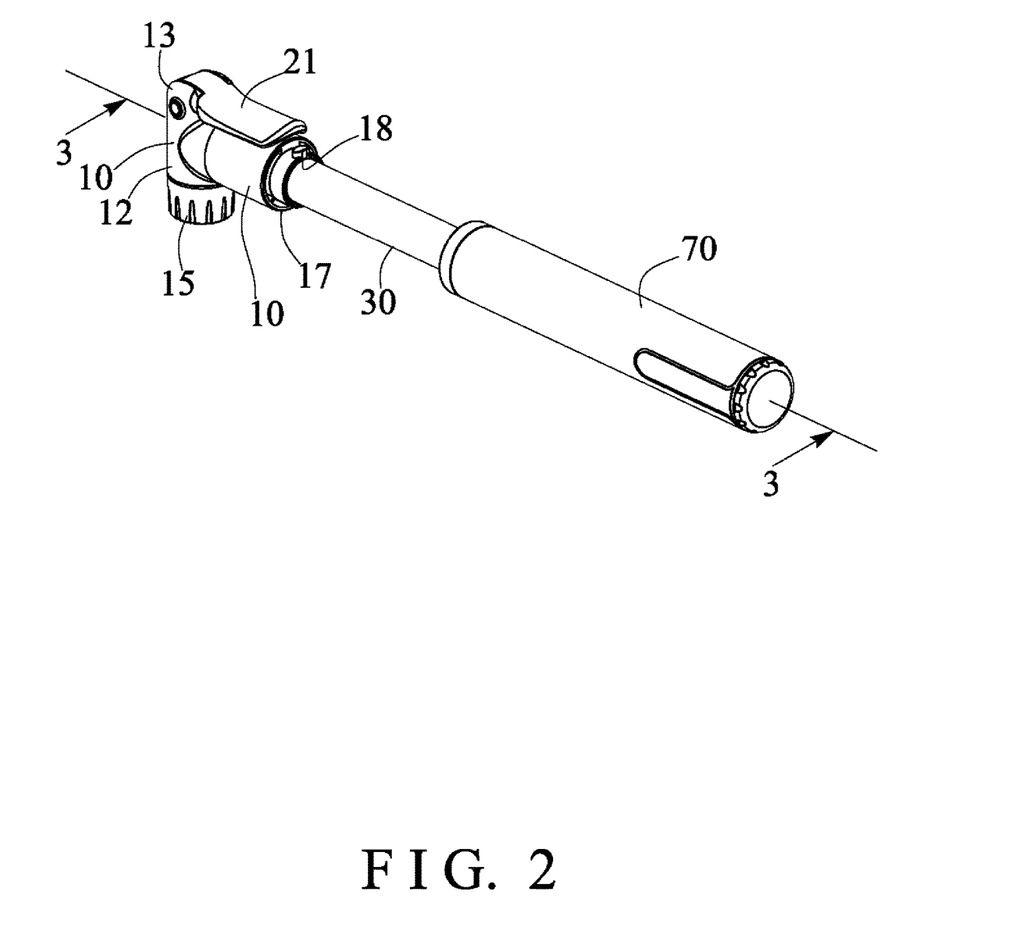
FIG. 2 is a perspective view of the air pump device.
Figure 3:
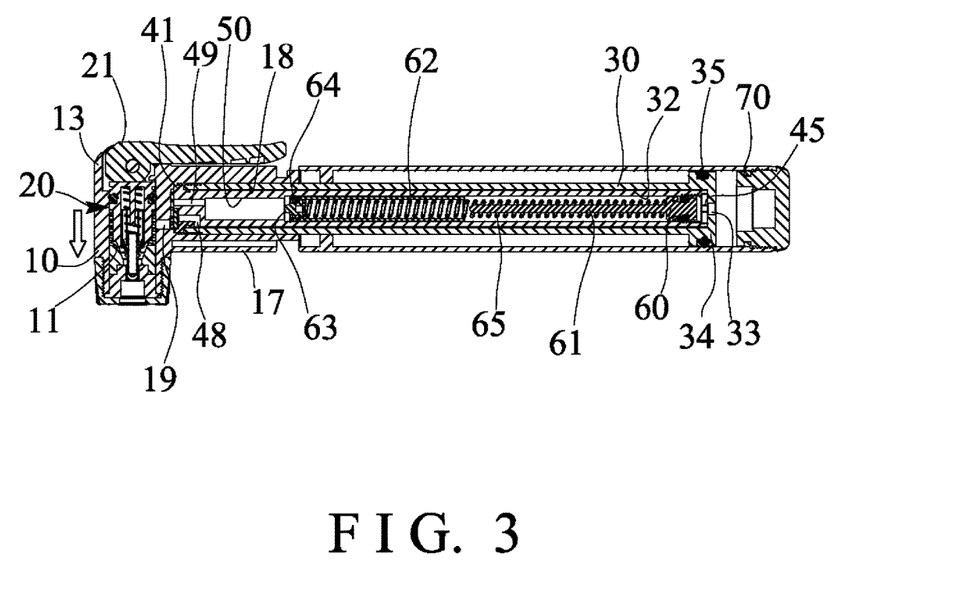
FIG. 3 is a cross sectional view of the air pump device taken along lines 3-3 of FIG. 2.

Referring to the drawings, and initially to FIGS. 1-3, an air pump device in accordance with the present invention comprises a head body or housing 10 including a compartment 11 formed therein and opened downwardly through a lower or bottom portion or one end portion 12 of the housing 10 (FIGS. 3-6), the housing 10 includes an upper portion or the other end portion 13, and includes a positioning or retaining or anchoring portion or device or member 14, such as an outer thread 14 (FIG. 1) formed or provided on the outer peripheral portion of the lower or bottom portion or the one end portion 12 of the housing 10 for threading or engaging with a control ferrule or barrel or sleeve or cover 15 or the like. For example, the cover 15 includes an inner thread 16 formed or provided therein for threading or engaging with the outer thread 14 that is formed in the one end portion 12 of the housing 10 and for detachably or changeably or selectively attaching or mounting or securing or coupling the cover 15 to the one end portion 12 of the housing 10.

The housing 10 further includes a stud or extension or inlet barrel 17 extended laterally and outwardly therefrom for connecting or coupling to a pressurized air reservoir or hand-held air pump which will be described in further details hereinafter. For example, the barrel 17 includes a chamber 18 formed therein, and includes a lateral orifice or entrance 19 formed therein, such as formed in or through the barrel 17 of the housing 10 and communicating with the compartment 11 of the housing 10 (FIGS. 3-8) for guiding the pressurized air to flow from the chamber 18 of the barrel 17 into the compartment 11 of the housing 10. An adaptor or elastic grasping member or device 20 is contained or engaged in the compartment 11 of the housing 10 for engaging with an inflation valve 90 and for resiliently or selectively grasping or holding the inflation valve 90 to the housing 10, and an actuating hand grip or handle 21 is pivotally or rotatably attached or mounted to the other end portion 13 of the housing 10 for selectively forcing the grasping device 20 to grasp the inflation valve 90 to the housing 10.

The above-described structure or configuration for the housing 10 and the grasping device 20 is typical and is not related to the present invention and will not be described in further details. The air pump device in accordance with the present invention further comprises an air pump or pumping mechanism 3 attached or mounted to the barrel 17 of the housing 10 for pumping or generating a pressurized air and for filling or supplying the pressurized air to the chamber 18 of the barrel 17 and then into the compartment 11 of the housing 10 and provided for selectively inflating various kinds of balls, inner tires of the bicycles or the motorcycles or the vehicles, or other inflatable article. For example, the pumping mechanism 3 includes a cylinder housing or tubular member 30 having one or first end portion 31 attached or mounted or coupled to the barrel 17 of the housing 10 with such as a threaded engagement 22 (FIGS. 7, 8), and having a chamber or compartment or space 32 formed therein, and having a passage 33 formed in the other or second end portion 34 of the tubular member 30 and communicating with the space 32 of the tubular member 30.

Figure 7:
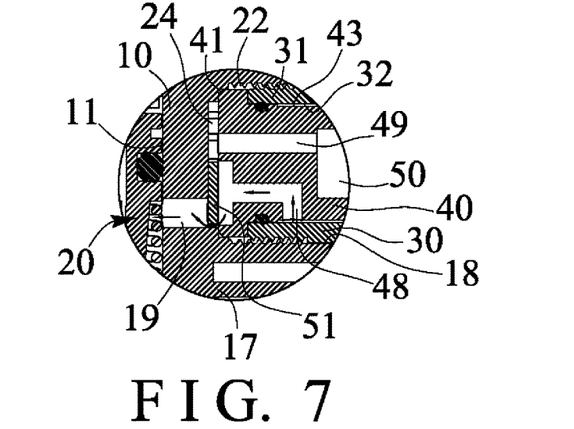
FIG. 7 is an enlarged partial cross sectional view of the air pump device as shown in FIG. 5.
Figure 8:
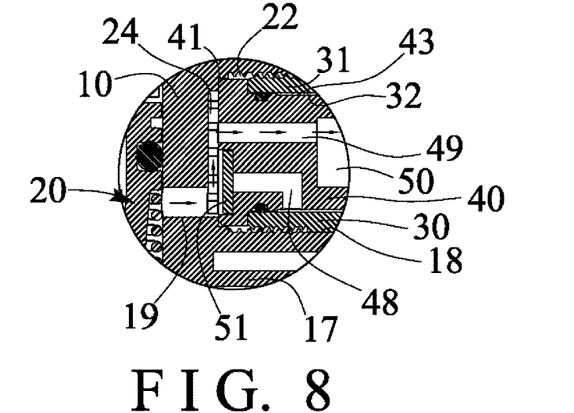
FIGS. 8, 9 are enlarged partial cross sectional views of the air pump device as shown in FIG. 6.

A cylindrical casing or element 40 is received or engaged in the space 32 of the tubular member 30, and includes a peripheral rib or flange 41 formed or provided on or extended radially and outwardly from the outer peripheral portion of the one or first end portion 42 of the cylindrical element 40 and engaged between the housing 10 and the first end portion 31 of the tubular member 30 for allowing the cylindrical element 40 to be solidly and stably anchored or retained between the housing 10 and the first end portion 31 of the tubular member 30, best shown in FIGS. 7 and 8. The cylindrical element 40 includes an outer diameter smaller than that of the inner diameter of the tubular member 30 for forming or defining a peripheral gap 43 between the cylindrical element 40 and the tubular member 30 (FIGS. 7-9) and for allowing the air to flow through the peripheral gap 43 that is formed between the cylindrical element 40 and the tubular member 30. The cylindrical element 40 is preferably made of transparent or semi-transparent materials and includes a scale or graduation 44 formed or provided thereon.

The cylindrical element 40 further includes one or more pegs or studs 45 extended axially and outwardly from the other or second end portion 46 of the cylindrical element 40 (FIG. 1) for forming or defining one or more notches or pathways 47 between the studs 45, and for allowing the air to flow from the passage 33 of the tubular member 30 through the pathways 47 that are formed between the studs 45, and then into the peripheral gap 43 that is formed between the cylindrical element 40 and the tubular member 30. The cylindrical element 40 further includes a bypass or manifold 48 and a passage 49 formed or provided in the first end portion 42 thereof, in which the passage 49 of the cylindrical element 40 is communicating with the inner bore 50 of the cylindrical element 40, and the manifold 48 is not communicating with the inner bore 50 of the cylindrical element 40, but communicating with the peripheral gap 43 that is formed between the cylindrical element 40 and the tubular member 30 and also communicating with the entrance 19 of the barrel 17 or of the housing 10. The housing 10 further includes a depression 24 formed or provided therein (FIGS. 7, 8), such as formed in the barrel 17 of the housing 10 and communicating with the entrance 19 of the barrel 17 or of the housing 10.

As best shown in FIGS. 3-6, the air from the passage 33 of the tubular member 30 may flow through the pathways 47 that are formed between the studs 45, and then into the peripheral gap 43 that is formed between the cylindrical element 40 and the tubular member 30, and as shown in FIGS. 7 and 8, the air from the gap 43 that is formed between the cylindrical element 40 and the tubular member 30 may then flow into the manifold 48 of the cylindrical element 40 and then may flow into the entrance 19 of the barrel 17 and the compartment 11 of the housing 10 in order to supply the pressurized air to inflate the inflation valve 90. The air may also flow through the passage 49 of the cylindrical element 40 and then may flow into the bore 50 of the cylindrical element 40 selectively. A check valve 51 is attached or mounted or secured to the barrel 17 of the housing 10, or attached to the cylindrical element 40, and/or engaged in the depression 24 of the barrel 17 of the housing 10, and disposed or engaged between the barrel 17 of the housing 10 and the cylindrical element 40 and/or engaged with the manifold 48 or the passage 49 of the cylindrical element 40.

For example, as shown in FIGS. 3-8, the check valve 51 is disposed or engaged with the manifold 48 of the cylindrical element 40 for controlling the air to flow through the manifold 48 of the cylindrical element 40. As shown in FIG. 7, the pressurized air from the gap 43 that is formed between the cylindrical element 40 and the tubular member 30 may flow into the manifold 48 of the cylindrical element 40, and may move or disengage the check valve 51 from the cylindrical element 40, and then may flow into the entrance 19 of the barrel 17 and the compartment 11 of the housing 10 in order to supply the pressurized air to inflate the inflation valve 90. Simultaneously, at this moment, the pressurized air may also flow through the depression 24 of the barrel 17 of the housing 10 and may flow into the passage 49 and the bore 50 of the cylindrical element 40. The check valve 51 may block the manifold 48 of the cylindrical element 40 and may prevent the pressurized air from flowing back into the manifold 48 of the cylindrical element 40 selectively.

A pressure gauge device 6 may further be provided and includes a lock nut 60 threaded or attached or mounted or secured to the other or second end portion 46 of the cylindrical element 40, a rod or shank 61 extended from the lock nut 60 and extended into the bore 50 of the cylindrical element 40, a follower or sliding member 62 slidably or movably received or engaged in the bore 50 of the cylindrical element 40 and having a pointer or indicator 63 formed or provided thereon and moved in concert with the sliding member 62 and moveable relative to the graduation 44 of the cylindrical element 40, a gasket or sealing ring 64 engaged onto the sliding member 62 and contacted or engaged with the cylindrical element 40 for making a water or air tight seal between the cylindrical element 40 and the sliding member 62, and a spring biasing member 65 engaged onto the shank 61 of the lock nut 60 and disposed or engaged between the lock nut 60 and the sliding member 62 for biasing and forcing or moving the sliding member 62 and the indicator 63 away from the lock nut 60 selectively.

The air pump or pumping mechanism 3 in accordance with the present invention further comprises a control ferrule or pumping sleeve 70 slidably or movably engaged onto the tubular member 30, and another gasket or sealing ring 35 attached or mounted or engaged onto the tubular member 30 and engaged between the tubular member 30 and the sleeve 70 for making a water or air tight seal between the tubular member 30 and the sleeve 70 and for allowing a pressurized air to be formed or generated by the sleeve 70 when the sleeve 70 is moved onto or toward the tubular member 30, and for supplying the pressurized air into or through the passage 33 of the tubular member 30, and then through the pathways 47 that are formed between the studs 45, and then into the peripheral gap 43 that is formed between the cylindrical element 40 and the tubular member 30, and the air may then flow into the manifold 48 and/or the passage 49 of the cylindrical element 40 and then may flow into the entrance 19 of the barrel 17 and the compartment 11 of the housing 10 and/or the bore 50 of the cylindrical element 40 selectively.

Figure 4:
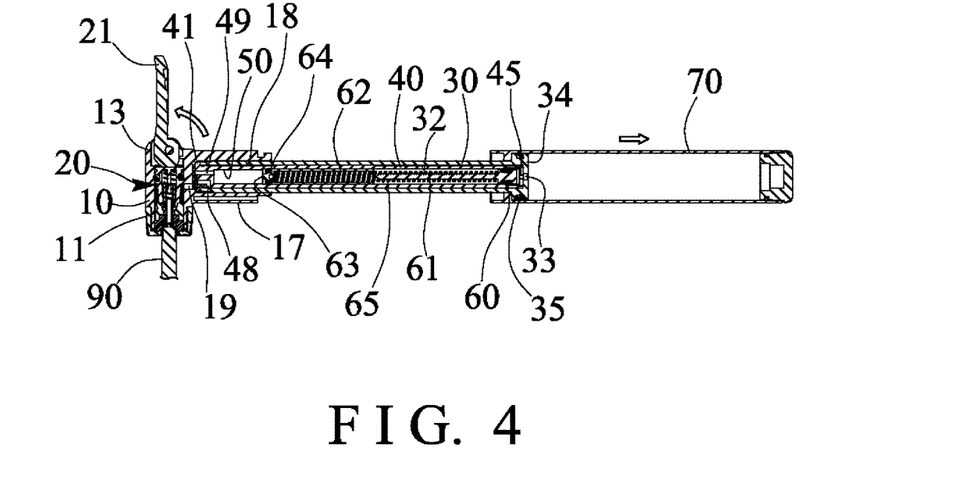
FIGS. 4, 5, 6 are cross sectional views similar to FIG. 3, illustrating the operation of the air pump device.
Figure 5:
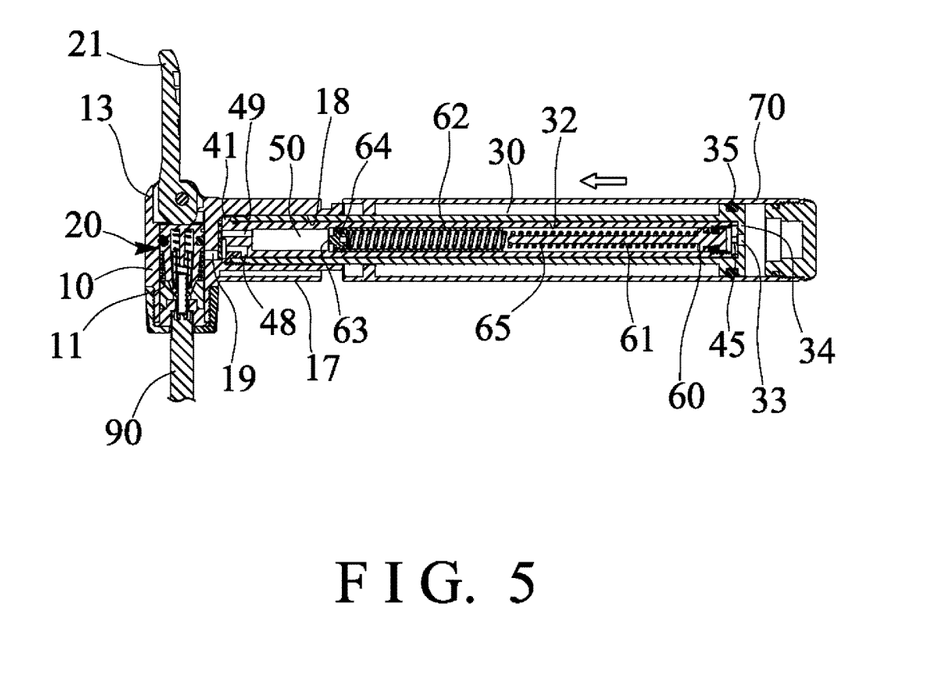
Figure 6:
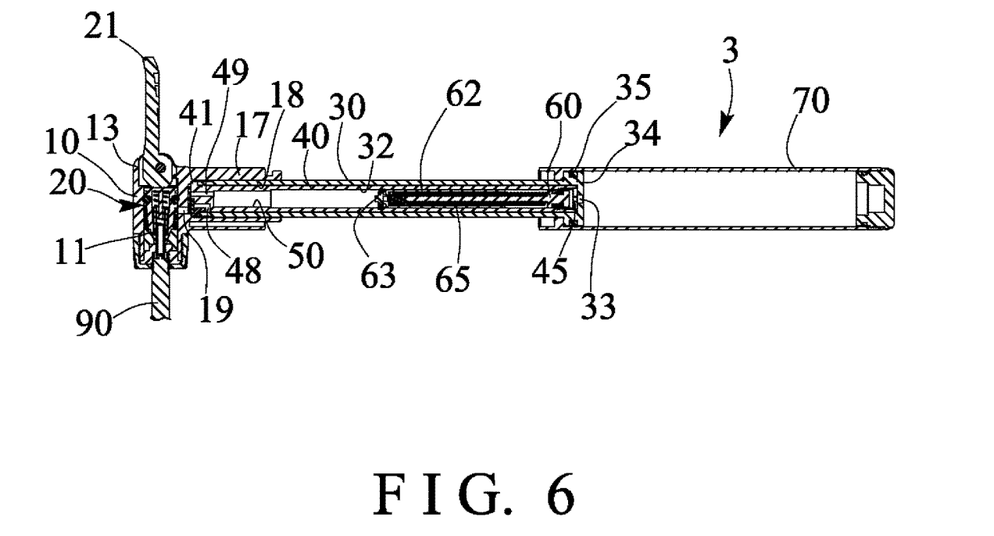

In operation, as shown in FIGS. 5 and 7, when the sleeve 70 is moved onto or toward the tubular member 30 in order to generate a pressurized air, the pressurized air may flow into or through the passage 33 of the tubular member 30, and then through the pathways 47 that are formed between the studs 45, and then into the peripheral gap 43 that is formed between the cylindrical element 40 and the tubular member 30, and the air may then flow into the manifold 48 of the cylindrical element 40 (FIG. 7) and may force or move or disengage the check valve 51 from the cylindrical element 40, for allowing the pressurized air to be supplied into the entrance 19 of the barrel 17 and the compartment 11 of the housing 10 in order to supply the pressurized air to inflate the inflation valve 90. As shown in FIGS. 4 and 6, when the sleeve 70 is moved away from the tubular member 30, the check valve 51 may be moved to block the manifold 48 of the cylindrical element 40 (FIG. 8) for allowing the pressurized air to flow through the depression 24 of the barrel 17 of the housing 10 and then to flow into the passage 49 and the bore 50 of the cylindrical element 40.

Figure 9:
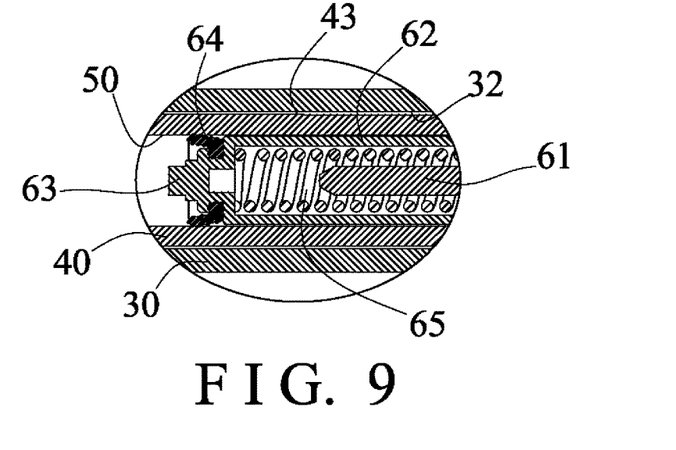

At this moment, as shown in FIGS. 6 and 9, the pressurized air may force or move the sliding member 62 onto or against the spring biasing member 65, and the sliding member 62 and the indicator 63 may then be forced to move relative to the graduation 44 of the cylindrical element 40, in order to show or indicate the pressure within the bore 50 of the cylindrical element 40. The tubular member 30 and the cylindrical element 40 are made of transparent or semi-transparent materials for allowing the relative position between the indicator 63 and the graduation 44 of the cylindrical element 40 to be seen by the users, and thus for allowing the pressure within the bore 50 of the cylindrical element 40 to be indicated and shown and to be seen and read by the users. It is to be noted that the pressure gauge device 6 is received or engaged in the bore 50 of the cylindrical element 40 and is not exposed, such that the pressure gauge device 6 may be prevented from interfering the operation of the air pump device.

Accordingly, the air pump device or hand pump in accordance with the invention includes an improved pressure gauge hidden or concealed within the air pump or hand pump for preventing the pressure gauge from being exposed and for preventing the pressure gauge from interfering the operation of the air pump device.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An air pump device comprising:
a housing including a compartment formed therein, and including a barrel having a chamber formed in said barrel, and having an entrance formed in said barrel and communicating with said compartment of said housing and communicating with said chamber of said barrel for guiding a pressurized air to flow from said chamber of said barrel into said compartment of said housing,
a grasper engaged in said compartment of said housing for engaging with an inflation valve and for grasping the inflation valve to said housing selectively,
a pumping mechanism coupled to said barrel of said housing for generating and supplying the pressurized air to said chamber of said barrel and said compartment of said housing, said pumping mechanism including a tubular member having a first end portion coupled to said barrel of said housing and having a passage formed in a second end portion of said tubular member, and said tubular member including a space formed therein and communicating with said passage of said tubular member for receiving the pressurized air from said passage of said tubular member, and
a pressure gauge device received and engaged within said pumping mechanism for indicating a pressure in said chamber of said barrel, and said space of said tubular member being provided for receiving said pressure gauge device, said pressure gauge device including a cylindrical element engaged in said space of said tubular member, and said cylindrical element including a graduation provided thereon, and an indicator slidably received and engaged in a bore of said cylindrical element and moveable relative to said graduation of said cylindrical element for indicating said pressure in said chamber of said barrel, said cylindrical element including a flange extended from a first end portion of said cylindrical element and engaged between said housing and said first end portion of said tubular member for anchoring said cylindrical element between said housing and said tubular member.

2. The air pump device as claimed in claim 1, wherein said tubular member and said cylindrical element are made of transparent materials for allowing a relative position between said indicator and said graduation of said cylindrical element to be seen through said tubular member and said cylindrical element.

3. The air pump device as claimed in claim 1, wherein said cylindrical element includes an outer diameter smaller than an inner diameter of said tubular member for forming a gap between said cylindrical element and said tubular member and for allowing the pressurized air to flow through said gap that is formed between said cylindrical element and said tubular member.

4. The air pump device as claimed in claim 3, wherein said cylindrical element includes a passage formed in a first end portion of said cylindrical element and communicating with said bore said cylindrical element for receiving the pressurized air into said bore said cylindrical element.

5. The air pump device as claimed in claim 4, wherein said cylindrical element includes at least one pathway formed in a second end portion of said cylindrical element and communicating with said gap that is formed between said cylindrical element and said tubular member.

6. The air pump device as claimed in claim 1, wherein said pressure gauge device includes a sliding member slidably engaged in said bore of said cylindrical element, and said indicator is provided on and moved in concert with said sliding member.

7. The air pump device as claimed in claim 6, wherein said pressure gauge device includes a sealing ring engaged onto said sliding member and contacted with said cylindrical element for making an air tight seal between said cylindrical element and said sliding member.

8. The air pump device as claimed in claim 1, wherein said pumping mechanism includes a sleeve slidably engaged onto said tubular member for generating the pressurized air when said sleeve is moved toward said tubular member.

9. An air pump device comprising:
a housing including a compartment formed therein, and including a barrel having a chamber formed in said barrel, and having an entrance formed in said barrel and communicating with said compartment of said housing and communicating with said chamber of said barrel for guiding a pressurized air to flow from said chamber of said barrel into said compartment of said housing,
a grasper engaged in said compartment of said housing for engaging with an inflation valve and for grasping the inflation valve to said housing selectively,
a pumping mechanism coupled to said barrel of said housing for generating and supplying the pressurized air to said chamber of said barrel and said compartment of said housing,
a pressure gauge device received and engaged within said pumping mechanism for indicating a pressure in said chamber of said barrel,
said pumping mechanism including a tubular member having a first end portion coupled to said barrel of said housing and having a passage formed in a second end portion of said tubular member, and said tubular member including a space formed therein and communicating with said passage of said tubular member for receiving the pressurized air from said passage of said tubular member, and said space of said tubular member being provided for receiving said pressure gauge device,
said pressure gauge device including a cylindrical element engaged in said space of said tubular member, and said cylindrical element including a graduation provided thereon, and an indicator slidably received and engaged in a bore of said cylindrical element and moveable relative to said graduation of said cylindrical element for indicating said pressure in said chamber of said barrel,
said cylindrical element including an outer diameter smaller than an inner diameter of said tubular member for forming a gap between said cylindrical element and said tubular member and for allowing the pressurized air to flow through said gap that is formed between said cylindrical element and said tubular member, wherein
said cylindrical element includes a manifold formed in a first end portion of said cylindrical element and communicating with said gap that is formed between said cylindrical element and said tubular member, and also communicating with said entrance of said barrel of said housing.

10. The air pump device as claimed in claim 9, wherein said pressure gauge device includes a check valve engaged between said barrel and said cylindrical element for controlling the pressurized air to flow through said manifold of said cylindrical element.

11. The air pump device as claimed in claim 10, wherein said housing includes a depression formed in said barrel and communicating with said entrance of said barrel for engaging with said check valve.

12. An air pump device comprising:
a housing including a compartment formed therein, and including a barrel having a chamber formed in said barrel, and having an entrance formed in said barrel and communicating with said compartment of said housing and communicating with said chamber of said barrel for guiding a pressurized air to flow from said chamber of said barrel into said compartment of said housing,
a grasper engaged in said compartment of said housing for engaging with an inflation valve and for grasping the inflation valve to said housing selectively,
a pumping mechanism coupled to said barrel of said housing for generating and supplying the pressurized air to said chamber of said barrel and said compartment of said housing,
a pressure gauge device received and engaged within said pumping mechanism for indicating a pressure in said chamber of said barrel,
said pumping mechanism including a tubular member having a first end portion coupled to said barrel of said housing and having a passage formed in a second end portion of said tubular member, and said tubular member including a space formed therein and communicating with said passage of said tubular member for receiving the pressurized air from said passage of said tubular member, and said space of said tubular member being provided for receiving said pressure gauge device,
said pressure gauge device including a cylindrical element engaged in said space of said tubular member, and said cylindrical element including a graduation provided thereon, and an indicator slidably received and engaged in a bore of said cylindrical element and moveable relative to said graduation of said cylindrical element for indicating said pressure in said chamber of said barrel,
said pressure gauge device including a sliding member slidably engaged in said bore of said cylindrical element, and said indicator being provided on and moved in concert with said sliding member, wherein
said pressure gauge device includes a lock nut attached to said cylindrical element, and a spring biasing member engaged between said lock nut and said sliding member for biasing and forcing said sliding member and said indicator to move away from said lock nut selectively.

13. The air pump device as claimed in claim 12, wherein said pressure gauge device includes a shank extended from said lock nut and extended into said bore of said cylindrical element and engaged into said spring biasing member.

* * * * *